US011384738B2

(12) United States Patent
Nielsen et al.

(10) Patent No.: US 11,384,738 B2
(45) Date of Patent: Jul. 12, 2022

(54) DETERMINING ICING CONDITION USING MECHANICAL WIND SENSOR

(71) Applicant: VESTAS WIND SYSTEMS A/S, Aarhus N (DK)

(72) Inventors: Johnny Nielsen, Svenstrup J (DK); Jacob Deleuran Grunnet, Tranbjerg J (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 96 days.

(21) Appl. No.: 16/957,096

(22) PCT Filed: Dec. 11, 2018

(86) PCT No.: PCT/DK2018/050345
§ 371 (c)(1),
(2) Date: Jun. 22, 2020

(87) PCT Pub. No.: WO2019/120408
PCT Pub. Date: Jun. 27, 2019

(65) Prior Publication Data
US 2020/0347827 A1 Nov. 5, 2020

(30) Foreign Application Priority Data
Dec. 22, 2017 (DK) ............................ PA 2017 71011

(51) Int. Cl.
*F03D 80/40* (2016.01)
*F03D 17/00* (2016.01)

(52) U.S. Cl.
CPC ............. *F03D 80/40* (2016.05); *F03D 17/00* (2016.05); *F05B 2260/80* (2013.01); *F05B 2270/32* (2013.01); *Y02E 10/72* (2013.01)

(58) Field of Classification Search
CPC ...... F03D 17/00; F03D 80/40; F05B 2260/80; F05B 2270/32; Y02E 10/72
See application file for complete search history.

(56) References Cited

U.S. PATENT DOCUMENTS 7,086,834 B2 *  8/2006  LeMieux .................. F03D 7/02
                                                          416/1
7,708,524 B2 *  5/2010  Sundermann ........... F03D 80/40
                                                          416/39

(Continued)

FOREIGN PATENT DOCUMENTS

DE     102010015595 A1    10/2011
EP         1936184 A2      6/2008

(Continued)

OTHER PUBLICATIONS

Danish Patent and Trademark Office, 1st Technical Examination of Patent Application PA 2017 71011, dated: Apr. 24, 2018.

(Continued)

*Primary Examiner* — Pedro J Cuevas
(74) *Attorney, Agent, or Firm* — Patterson + Sheridan, LLP (57) ABSTRACT

Embodiments herein describe a method and associated controller for a wind turbine. The method comprises determining one or more characteristics of a sensor signal received from a mechanical sensor of the wind turbine; determining, based on the one or more characteristics of the sensor signal, an icing condition of the wind turbine; and controlling operation of one or more wind turbine systems based on the determined icing condition.

19 Claims, 10 Drawing Sheets

(56) References Cited

U.S. PATENT DOCUMENTS

| | | | | |
|---|---|---|---|---|
| 8,050,887 | B2* | 11/2011 | Ahmann | F03D 80/40 702/142 |
| 8,200,451 | B2* | 6/2012 | Battisti | F03D 80/40 702/136 |
| 8,558,401 | B2* | 10/2013 | Girardin | G01W 1/00 290/44 |
| 9,567,869 | B2* | 2/2017 | Lauritsen | F03D 7/042 |
| 9,638,168 | B2* | 5/2017 | Castro | F03D 7/0224 |
| 9,690,008 | B2* | 6/2017 | Antikainen | G01W 1/04 |
| 10,584,683 | B2* | 3/2020 | Lysgaard | F03D 7/0224 |
| 11,174,838 | B2* | 11/2021 | Nielsen | F03D 7/0224 |
| 2005/0276696 | A1* | 12/2005 | LeMieux | F03D 7/02 416/61 |
| 2010/0111695 | A1* | 5/2010 | Klausmann | F03D 80/40 416/39 |
| 2011/0081226 | A1 | 4/2011 | Wobben | |
| 2011/0089692 | A1* | 4/2011 | Girardin | F03D 7/0264 290/44 |
| 2011/0280723 | A1* | 11/2011 | Libergren | F03D 80/40 416/1 |
| 2013/0106108 | A1* | 5/2013 | De Boer | F03D 1/0675 290/44 |
| 2013/0195657 | A1* | 8/2013 | Lauritsen | F03D 80/40 416/1 |
| 2014/0192356 | A1* | 7/2014 | Antikainen | G01N 21/538 356/342 |
| 2017/0058871 | A1* | 3/2017 | Movsichoff | F03D 7/0224 |
| 2019/0072082 | A1* | 3/2019 | Lysgaard | G01M 11/081 |
| 2020/0116132 | A1* | 4/2020 | Grun | F03D 80/40 |
| 2020/0124032 | A1* | 4/2020 | Grun | F03D 80/40 |
| 2020/0158092 | A1* | 5/2020 | Lysgaard | F03D 17/00 |
| 2020/0347827 | A1* | 11/2020 | Nielsen | F03D 80/40 |

FOREIGN PATENT DOCUMENTS

| | | |
|---|---|---|
| EP | 3009673 A1 | 4/2016 |
| WO | 2019120408 A1 | 6/2019 |

OTHER PUBLICATIONS

Danish Patent and Trademark Office, Search Opinion, Application: PA 2017 71011, dated: Apr. 24, 2018.
PCT, Written Opinion of the International Searching Authority, Application: PCT/DK2018/0503045, dated: Apr. 24, 2018.
PCT. International Search Report for application: PCT/DK2018/050345 dated Apr. 24, 2018.

* cited by examiner

DETERMINING ICING CONDITION USING MECHANICAL WIND SENSOR

BACKGROUND

Field of the Invention

Embodiments presented in this disclosure generally relate to determining icing conditions on wind turbines, and more specifically, to using one or more mechanical wind sensors to determine icing conditions on associated wind turbines.

Description of the Related Art

Wind turbines are often placed in colder regions as the higher density of cold air corresponds to greater power production, and because other energy producing systems may be impractical in these regions. However, in cold regions, ice formation on the wind turbines is also more likely. Ice formation on the turbines lowers efficiency and removing the ice can require stopping the turbine, further reducing efficiency. Currently, wind turbines with anti-icing or deicing systems use a significant reduction of the power curve to detect ice on the blades. However, this technique is generally unable to detect icing conditions before a substantial amount of ice has already accumulated on the blades. Further, the deicing system might be unable to remove the ice if the icing conditions are ongoing, and/or ice may again accumulate soon after the deicing is finished. Other ice detection implementations may use accelerometers on the inside of the wind turbine blades or may use dedicated ice detection instruments on the nacelle, which are relatively expensive implementations.

SUMMARY

One embodiment of the present disclosure is a controller for a wind turbine, the controller comprising one or more computer processors and a memory comprising computer-readable code that, when executed using the one or more computer processors, performs an operation. The operation comprises determining one or more characteristics of a sensor signal received from a mechanical sensor of the wind turbine. The operation further comprises determining, based on the one or more characteristics of the sensor signal, an icing condition of the wind turbine. The operation further comprises controlling operation of one or more wind turbine systems based on the determined icing condition.

Beneficially, the controller allows the icing condition of the wind turbine to be determined without reducing the power production of the wind turbine. Further, the controller may be capable of determining whether an accumulation of ice on the wind turbine is increasing or decreasing. Still further, the controller may support a relatively simple implementation using mechanical sensors that are typically included on the wind turbine, without requiring more expensive sensors that are dedicated to detecting ice.

Another embodiment described herein is a method comprising determining one or more characteristics of a sensor signal received from a mechanical sensor of a wind turbine; determining, based on the one or more characteristics of the sensor signal, an icing condition of the wind turbine; and controlling operation of one or more wind turbine systems based on the determined icing condition.

Beneficially, the method allows the icing condition of the wind turbine to be determined without reducing the power production of the wind turbine. Further, the method may be used to whether an accumulation of ice on the wind turbine is increasing or decreasing. Still further, the method may be performed using a relatively simple implementation using mechanical sensors that are typically included on the wind turbine, without requiring more expensive sensors that are dedicated to detecting ice.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

A wind turbine uses a rotor comprising one or more blades to convert kinetic energy of the wind into electrical energy. More specifically, the velocity of the wind causes the blades to rotate, which in turn powers an electric generator. The accumulation of ice on the blades tends to reduce the power production of the wind turbine for given wind conditions. Additionally, the accumulation of ice on the blades may cause imbalance(s) that may be capable of damaging the wind turbine.

Different techniques may be used to remove ice that has accumulated on wind turbine blades, either during power production (e.g., while the blades are rotating) or when the wind turbine is at a standstill. Although continued operation of the wind turbine with ice accumulation may correspond to a reduced efficiency, in some cases this may be economically preferable compared to stopping the wind turbine rotor to perform a deicing procedure.

Embodiments disclosed herein describe techniques for using mechanical sensor(s) of the wind turbine to determine an icing condition of the wind turbine. Beneficially, using the mechanical sensor(s) to determine the icing condition may be performed without reducing the power production of the wind turbine. The sensor signal(s) of the mechanical sensor(s) may be used to determine whether an accumulation of ice on the wind turbine is increasing or decreasing. Further, the mechanical sensor(s) may be included in typical wind turbine implementations for wind measurements, without requiring more expensive sensors that are dedicated to detecting ice.

EXAMPLE EMBODIMENTS

Figure 1:
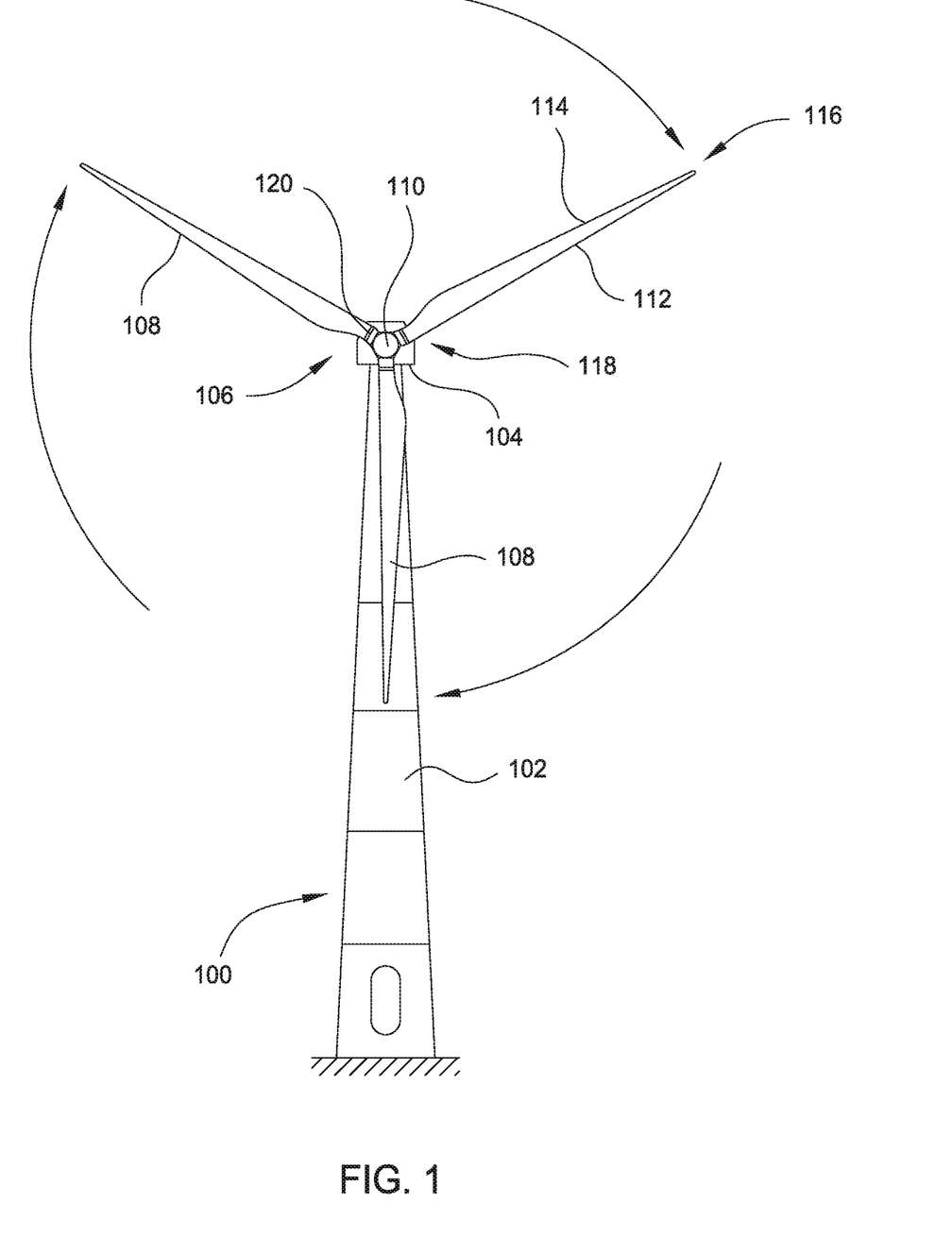
FIG. 1 illustrates a diagrammatic view of an exemplary wind turbine, according to one or more embodiments.

FIG. 1 illustrates a diagrammatic view of an exemplary wind turbine 100. Although the wind turbine 100 is illustrated as a horizontal-axis wind turbine, the principles and techniques described herein may be applied to other wind turbine implementations, such as vertical-axis wind turbines. The wind turbine 100 typically comprises a tower 102 and a nacelle 104 located at the top of the tower 102. A rotor 106 may be connected with the nacelle 104 through a low-speed shaft extending out of the nacelle 104. As shown, the rotor 106 comprises three rotor blades 108 mounted on a common hub 110 which rotate in a rotor plane, but the rotor 106 may comprise any suitable number of blades, such as one, two, four, five, or more blades. The blades 108 (or airfoil) typically each have an aerodynamic shape with a leading edge 112 for facing into the wind, a trailing edge 114 at the opposite end of a chord for the blades 108, a tip 116, and a root 118 for attaching to the hub 110 in any suitable manner.

For some embodiments, the blades 108 may be connected to the hub 110 using pitch bearings 120, such that each blade 108 may be rotated around its longitudinal axis to adjust the blade's pitch. The pitch angle of a blade 108 relative to the rotor plane may be controlled by linear actuators, hydraulic actuators, or stepper motors, for example, connected between the hub 110 and the blades 108.

Figure 2:
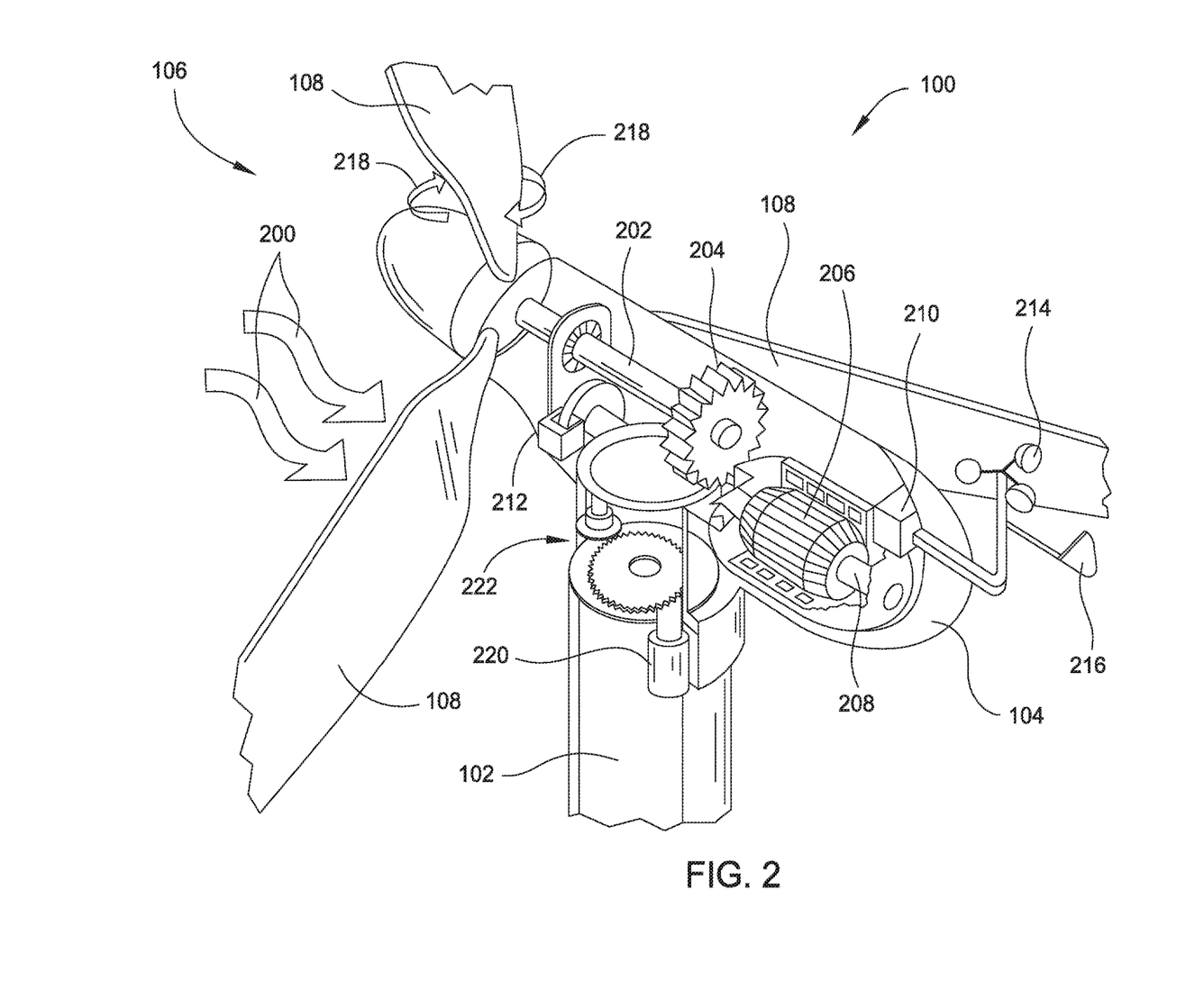
FIG. 2 illustrates a diagrammatic view of internal components of an exemplary nacelle and tower of a wind turbine, according to one or more embodiments.

FIG. 2 illustrates a diagrammatic view of typical components internal to the nacelle 104 and tower 102 of the wind turbine 100. When the wind 200 is incident on the blades 108, the rotor 106 rotates and rotates a low-speed shaft 202. Gears in a gearbox 204 mechanically convert the low rotational speed of the low-speed shaft 202 into a relatively high rotational speed of a high-speed shaft 208 suitable for generating electricity using a generator 206.

A controller 210 may sense the rotational speed of one or both of the low-speed shaft 202 and the high-speed shaft 208. If the controller 210 determines that the shaft(s) are rotating too fast, the controller 210 may pitch the blades out of the wind or by increasing the torque form the generator 206 which slows the rotation of the rotor 106—i.e., reduces the revolutions per minute (RPM). A braking system 212 may prevent damage to the components of the wind turbine generator 100 by keeping the hub 110 from rotating when the hub is already at, or very close, to standstill. The controller 210 may also receive inputs from an anemometer 214 (providing wind speed) and/or a wind vane 216 (providing wind direction). Based on information received, the controller 210 may send a control signal to one or more of the blades 108 to adjust the pitch 218 of the blades. By adjusting the pitch 218 of the blades, the rotational speed of the rotor (and therefore, the shafts 202, 208) may be increased or decreased. Based on the wind direction, for example, the controller 210 may send a control signal to an assembly comprising a yaw motor 220 and a yaw drive 222 to rotate the nacelle 104 with respect to the tower 102, such that the rotor 106 may be positioned to face more (or, in certain circumstances, less) upwind.

Figure 3:
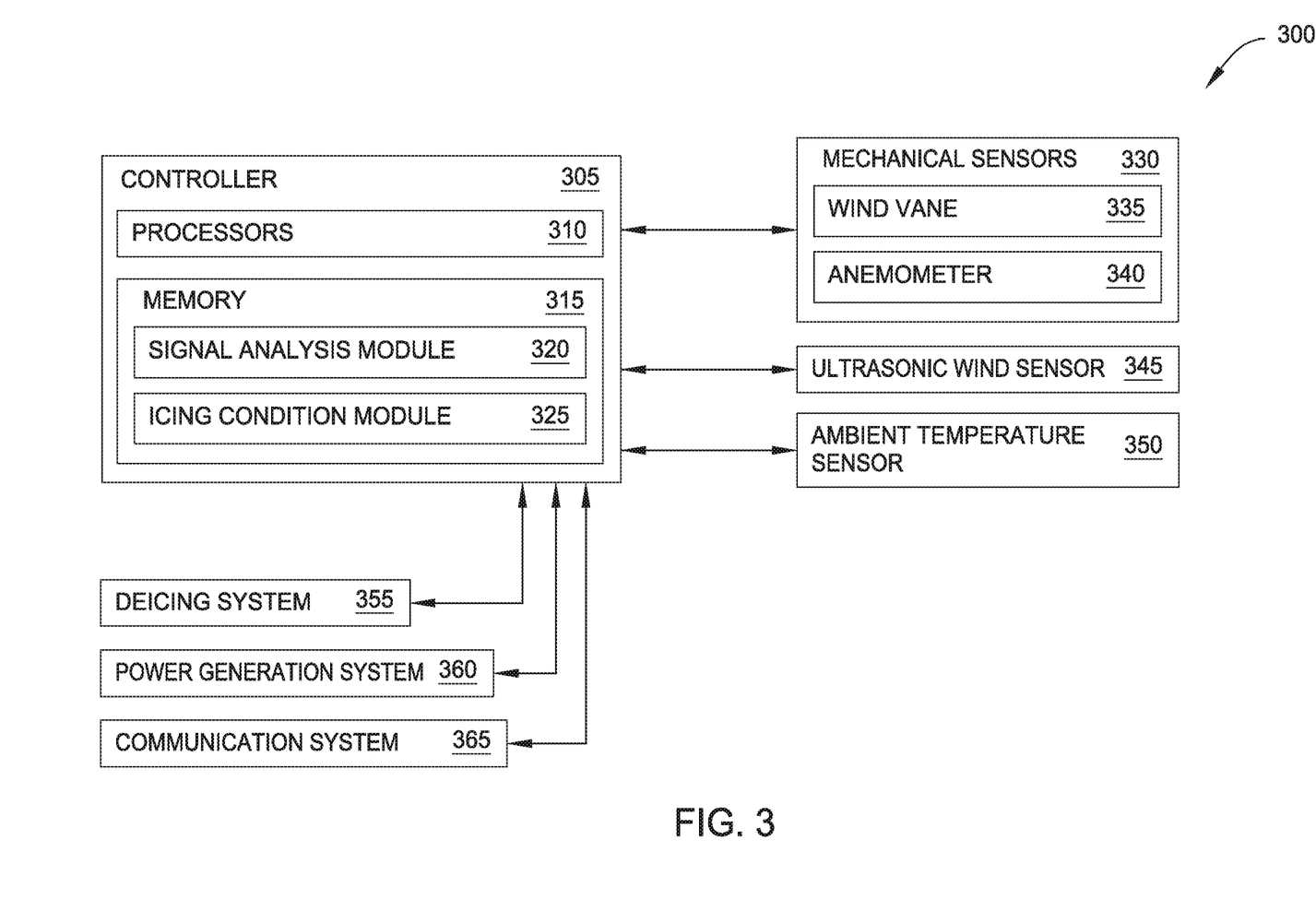
FIG. 3 is a block diagram of an exemplary wind turbine, according to one or more embodiments.

FIG. 3 is a block diagram of an exemplary wind turbine 300, according to one or more embodiments. The wind turbine 300 may be used in conjunction with other embodiments described herein. For example, the wind turbine 300 may represent one example of the wind turbine 100 of FIG. 1.

The wind turbine 300 comprises a controller 305 comprising one or more computer processors 310 (or "processors") and a memory 315. The one or more processors 310 represent any number of processing elements that each can include any number of processing cores. The memory 315 can include volatile memory elements (such as random access memory), non-volatile memory elements (such as solid-state, magnetic, optical, or Flash-based storage), and combinations thereof. Moreover, the memory 315 can be distributed across different mediums (e.g., network storage or external hard drives).

As shown, the one or more processors 310 are communicatively coupled with one or more mechanical sensors 330, an ultrasonic wind sensor 345, and an ambient temperature sensor 350. The one or more processors 310 are further coupled with one or more wind turbine systems, such as a deicing system 355, a power generation system 360, and a communication system 365. Other implementations of the wind turbine 300 having different numbers and/or types of sensors, and/or different numbers and/or types of wind turbine systems, are also possible.

The mechanical sensors 330, the ultrasonic wind sensor 345, and the ambient temperature sensor 350 are each configured to provide one or more sensor signals to the controller 305. As shown, the mechanical sensors 330 comprise a wind vane 335 that is configured to generate a wind direction signal, and an anemometer 340 that is configured to generate a wind speed signal. The anemometer 340 may have any suitable mechanical implementation, such as a cup anemometer or a vane anemometer. Other embodiments of the wind turbine 300 may include only one of the wind vane 335 and the anemometer 340 as mechanical sensors 330.

In some embodiments, each of the mechanical sensors 330 is configured to generate a respective sensor signal (e.g., a wind direction signal or a wind speed signal) through rotation of the respective mechanical sensor 330 around an axis. Using FIG. 2 as an example, the anemometer 214 is configured to rotate around a substantially vertical axis as illustrated. An increase or decrease in the accumulation of ice on the mechanical sensor 330 affects its ability to rotate, which in turn is reflected in the generated sensor signal. In some embodiments, therefore, the accumulation of ice on a mechanical sensor 330 (or an icing condition of the mechanical sensor 330) may be determined based on one or more characteristics of the sensor signal. For example, the accumulation of ice adds mass to a particular mechanical sensor 330, which affects the generated sensor signal due to a mechanical damping effect. The affected sensor signal may then be used to infer an icing condition of the wind turbine 300 (e.g., a likelihood that ice is also accumulating on the blades).

Although the examples of mechanical sensors 330 are described in terms of rotating mechanical sensors, the techniques discussed herein may be applied to other mechanical sensors 330 having different types of physical actuation, e.g., linear reciprocating motion. It is contemplated that the accumulation of ice on these other mechanical sensors 330 may also exhibit detectable effects on the generated sensor signals.

The memory 315 may include a plurality of "modules" for performing various functions described herein. In one embodiment, each module includes program code that is executable by one or more of the processors 310. However, other embodiments may include modules that are partially or fully implemented in hardware (i.e., circuitry) or firmware.

The memory 315 comprises a signal analysis module 320 that is configured to determine one or more characteristics of sensor signals received from the mechanical sensors 330. In some embodiments, the signal analysis module 320 is configured to determine one or more characteristics of the received sensor signals within the frequency domain. In one embodiment, the signal analysis module 320 is configured to determine frequency information (or "content") that is included in a received sensor signal, e.g., by performing a Fast Fourier Transform (FFT) on the received sensor signal. Other frequency analysis techniques are also possible. In some embodiments, the signal analysis module 320 is configured to determine one or more characteristics of the received sensor signals within the time domain. In one embodiment, the signal analysis module 320 is configured to determine a moving standard deviation of the sensor signal (e.g., using amplitude information of the time-based sensor signal).

As will be discussed further, the signal analysis module 320 may be configured to perform further processing on the received sensor signals. In one example, the signal analysis module 320 may compare the one or more characteristics of the sensor signals with one or more predefined threshold values. In another example, the signal analysis module 320 may compare the one or more characteristics of the sensor signals with one or more reference signals. The one or more reference signals may correspond to sensor signals acquired under particular conditions, such as a predefined no-ice condition. Other techniques that are suitable for distinguishing the one or more characteristics of the sensor signals are also possible.

The memory 315 further comprises an icing condition module 325 that is configured to determine, based on the one or more characteristics of the sensor signals, an icing condition of the wind turbine 300. As discussed above, the accumulation of ice on the mechanical sensors 330 may serve as an indicator for the controller 305 to infer that ice is accumulating on other surfaces of the wind turbine 300, such as the blades.

The icing condition of the wind turbine 300 may be provided in any suitable format. Some non-limiting examples of the icing condition include a binary "yes" or "no" whether ice has formed on the wind turbine 300, a likelihood that ice has formed on the wind turbine 300, an estimate of how much ice has formed on the wind turbine 330 (e.g., an overall weight or weight distribution of the ice, an ice coverage area for a surface of the wind turbine 300), whether an accumulation of ice on the wind turbine 300 is increasing or decreasing, a rate of change of the accumulation of ice, and so forth.

In some embodiments, the icing condition of the wind turbine 300 may be verified (or validated) using other sensors, such as the ultrasonic wind sensor 345 and/or the ambient temperature sensor 350. The sensor signals acquired by the mechanical sensors 330 may be affected by physical conditions other than ice accumulation, such as increased friction resulting from a loss of lubrication or from damage to the mechanical sensor 330. For example, the controller 305 may validate the one or more characteristics of the sensor signal using ambient temperature information from the ambient temperature sensor 350. For example, if the ambient temperature is sufficiently far from the freezing point of water, say 6° C. (or 42.8° F.), the controller 305 may determine that the one or more characteristics of the sensor signal more strongly indicate that there are maintenance issues with the mechanical sensor 330 instead of ice accumulation.

In some embodiments, the icing condition of the wind turbine 300 may be used by the controller 305 to determine how to (or whether to) employ non-mechanical sensors, such as the ultrasonic wind sensor 345. In one example, the controller 305 uses only the mechanical sensors 330 to acquire wind information during a no-ice condition of the wind turbine 300, and (also) uses the ultrasonic wind sensor 345 to acquire wind information when the sensor signals from the mechanical sensors 330 indicate that there is an accumulation of ice on the wind turbine 300. In another example, the controller 305 provides relative weights to the wind measurements acquired by the mechanical sensors 330 and by the ultrasonic wind sensor 345 when acquiring wind information. In this case, the controller 305 may provide a lower weight to the wind measurements from the mechanical sensors 330 when there is an accumulation of ice on the wind turbine 300, when compared with a no-ice condition. For example, assume that the controller 305 weights the wind measurements equally (i.e., 50% from the wind measurements of the mechanical sensors 330 and 50% from the wind measurements of the ultrasonic wind sensor 345) when there is a no-ice condition. The controller 305 may then weight the wind measurements of the mechanical sensors 330 differently (e.g., reduced from 50% to 10%) when there is an accumulation of ice. Further, the values of the weights may be dynamically adjusted based on the determined icing condition. For example, if the controller 305 determines that an accumulation of ice on the mechanical sensors 330 is decreasing (which corresponds to an increased confidence in the accuracy of the wind measurements), the weight associated with the wind measurements of the mechanical sensors 330 may be gradually increased.

The controller 305 is configured to control operation of one or more wind turbine systems, such as the deicing system 355, the power generation system 360, and/or the communication system 365, based on the determined icing condition. The controller 305 may be configured to operate the one or more wind turbine systems contemporaneously, such as communicating icing condition information using the communication system 365 while operating the power generation system 360 with reduced efficiency, activating and operating the deicing system 355 while operating the power generation system 360, and so forth.

The deicing system 355 may perform deicing of the blades of the wind turbine 300 using any suitable techniques, such as electro-thermal heating of the blades using heating elements disposed therein or thereon, applying chemicals such as alcohols, glycols, or salts to the blades, mechanical techniques such as introducing vibrations to the blades or rotor speed changes, redirecting hot air or exhaust from the nacelle into the blades, or combinations thereof.

In another embodiment, the wind turbine 300 may comprise an anti-icing system configured to inhibit ice accumulation on the blades and/or other surfaces of the wind turbine 300. The anti-icing system may perform techniques similar to the deicing system 355, such as electro-thermal heating, applying chemicals to cover the surface with a protective layer or to continuously apply a fluid such as glycol to the susceptible surfaces, applying hydrophobic fluids or materials to the blades, redirecting hot air or exhaust into the blades, and so forth.

In some embodiments, the controller 305 is configured to activate the deicing system 355 for a predefined icing condition, e.g., when the icing condition module 325 indicates that ice has accumulated on the wind turbine 300. The controller 305 may be further configured to control the rate of operation of the deicing system 355 (e.g., the amount of power applied to the heating elements, the amount of chemicals applied to the blades, the vibration amplitude, etc.) based on the icing condition of the wind turbine 300.

The power generation system 360 of the wind turbine 300 comprises the main wind turbine generator of the wind turbine 300 and other components associated with generation, conversion, and/or distribution of electrical power to an electrical grid, such as a blade pitching system, electrical converters, switching elements, filters, and so forth. The power generation system 360 may further comprise any auxiliary power sources (e.g., diesel generators, batteries, etc.) included in the wind turbine 300. In some embodiments, the controller 305 is configured to operate the power generation system 360 with a reduced efficiency based on the determined icing condition.

In some embodiments, the controller 305 is further configured to determine whether operating the power generation system 360 with a reduced efficiency is more economically beneficial (e.g., results in less power production lost) than operating the deicing system 355. For example, in some implementations of the wind turbine 300, operating the deicing system 355 may require that the wind turbine 300 be brought to a standstill and may correspond to up to 1 or 2 hours of 100% lost production. However, continuing to generate power with a reduced efficiency might be more economically advantageous than deicing the wind turbine 300 when the accumulation of ice is not expected to last longer than some period of time (e.g., hours, days, weeks, etc., depending on the amount of ice and/or the amount of reduction in efficiency).

Further, performing deicing of the wind turbine 300 may have a limited effect in cases where the icing condition information indicates that ice is continuing to accumulate. Even if the deicing system 355 is applied to the wind turbine 300, ice may again accumulate on the wind turbine 300 in a relatively short amount of time due to the ambient conditions. Therefore, in some embodiments, the icing condition information that is provided by the icing condition module 325 may be used to determine which operation to perform using the wind turbine systems. For example, when the icing condition information indicates that an accumulation of ice is increasing, the controller 305 may determine that it is more economically beneficial to perform a first predefined operation, such as operating the power generation system 360 with a reduced efficiency. When the icing condition information indicates that the accumulation of ice is not increasing, the controller 305 may perform a second predefined operation, such as operating the deicing system 355.

The communication system 365 comprises any suitable means (e.g., wireline, wireless, optical, etc.) for communicating the icing condition information to one or more computing devices external to the wind turbine 300. In some embodiments, the communication system 365 may be implemented at least partially using circuitry included within the controller 305, such as an installed network interface card. In other embodiments, the communication system 365 is implemented using circuitry separate from the controller 305.

Consistent with the discussion above, the icing condition information may be communicated by the communication system 365 in any suitable format. Some non-limiting examples of the icing condition information include a binary "yes" or "no" whether ice has formed on the wind turbine 300, a likelihood that ice has formed on the wind turbine 300, whether an accumulation of ice on the wind turbine 300 is increasing or decreasing, and so forth. Beneficially, communication of the icing condition information using the communication system 365 may inform clients, wind turbine operators, maintenance personnel, etc. why the wind turbine 300 has a decreased power production for the given wind conditions.

Figure 4:
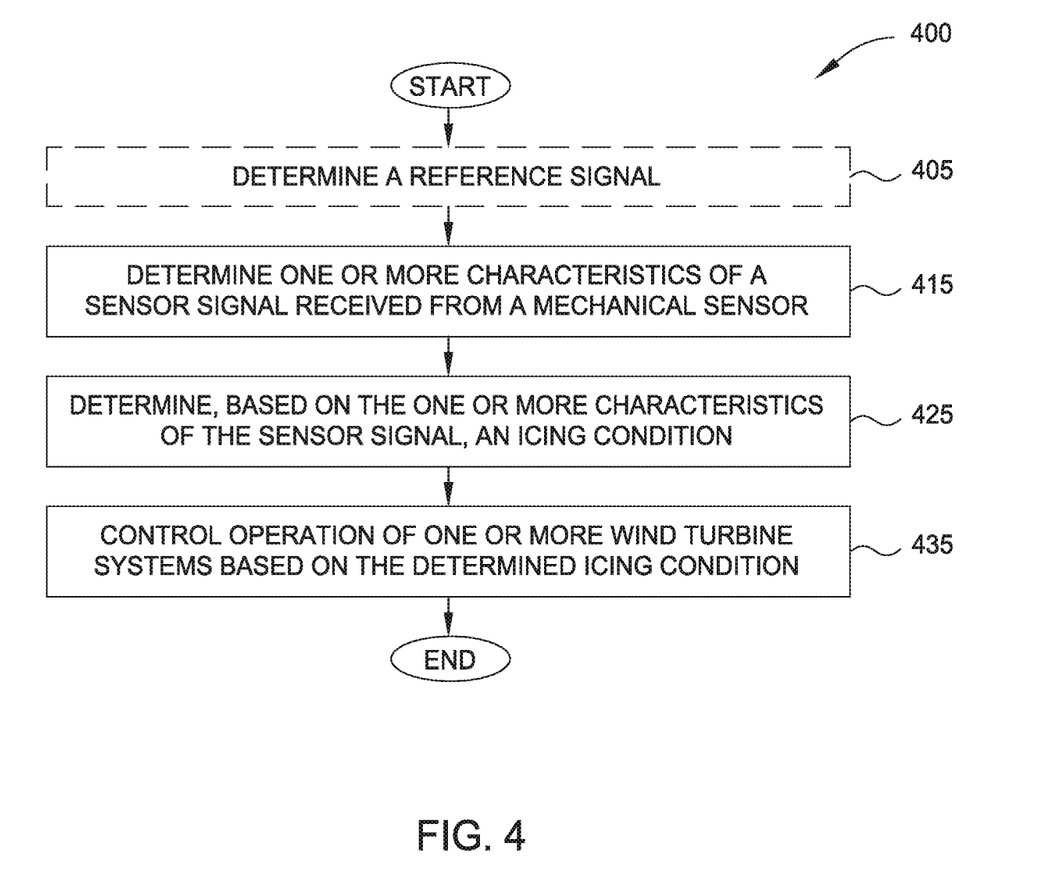
FIG. 4 illustrates an exemplary method for controlling operation of a wind turbine based on a determined icing condition, according to one or more embodiments.

FIG. 4 illustrates an exemplary method 400 for controlling operation of a wind turbine based on a determined icing condition, according to one or more embodiments. The method 400 may be performed in conjunction with embodiments disclosed herein, such as using the controller 305 of FIG. 3.

Method 400 optionally begins at block 405, where the controller determines a reference signal. The reference signal may correspond to an acquired sensor signal acquired under particular conditions, such as a predefined no-ice condition. At block 415, the controller determines one or more characteristics of a sensor signal received from a mechanical sensor. In some embodiments, the sensor signal comprises one of a wind speed signal and a wind direction signal. In some embodiments, the controller determines the one or more characteristics of the sensor signal within the frequency domain. In some embodiments, the controller determines the one or more characteristics of the sensor signal within the time domain.

At block 425, the controller determines an icing condition of the wind turbine based on the one or more characteristics of the sensor signal. At block 435, the controller controls operation of one or more wind turbine systems based on the determined icing condition. In some embodiments, the controller controls one or more of a deicing system, a power generation system, and a communication system based on the determined icing condition. Method 400 ends following completion of block 435.

Figure 5A:
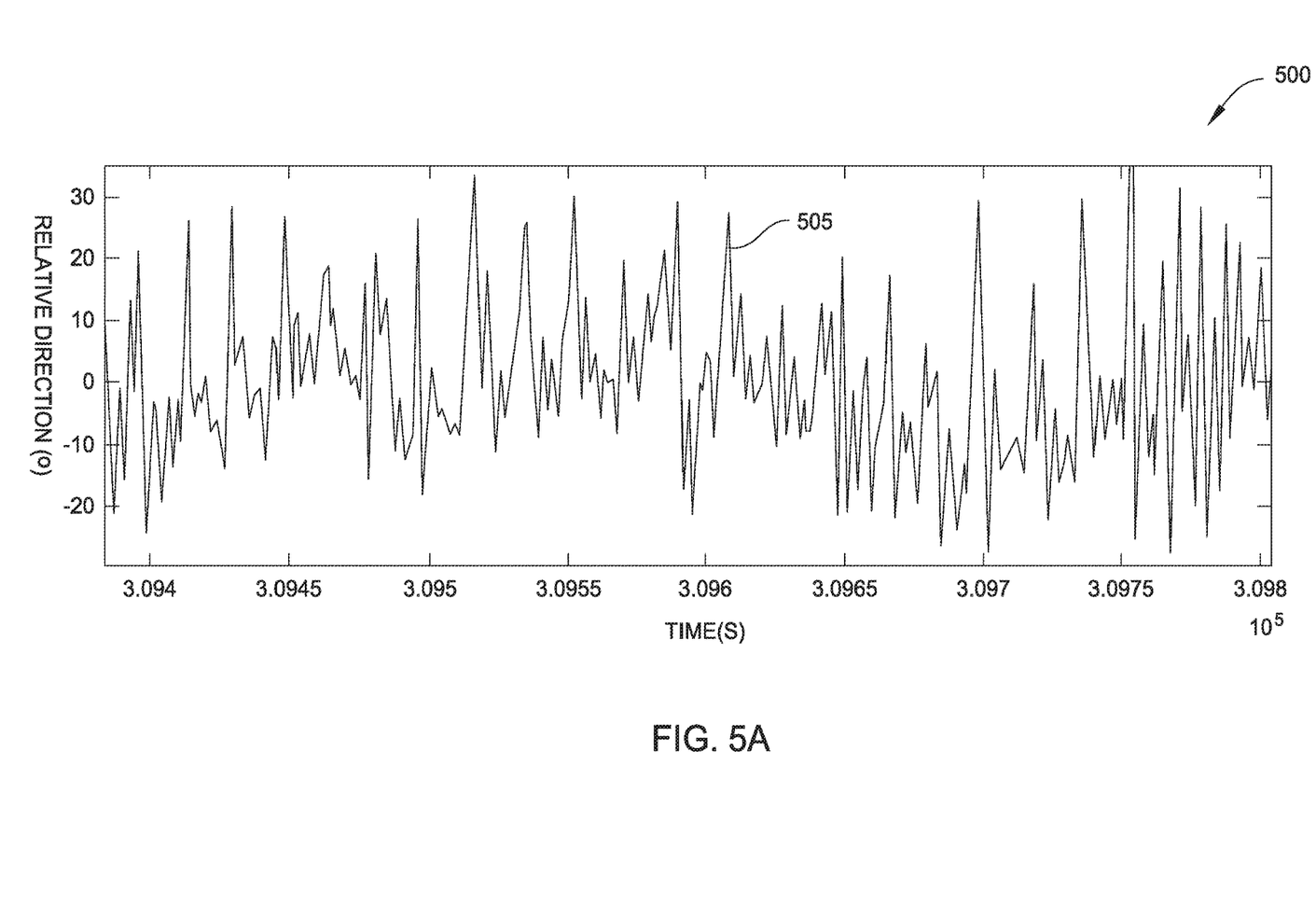
FIGS. 5A and 5B illustrate exemplary sensor signals without ice accumulation and with ice accumulation, respectively, according to one or more embodiments.
Figure 5B:
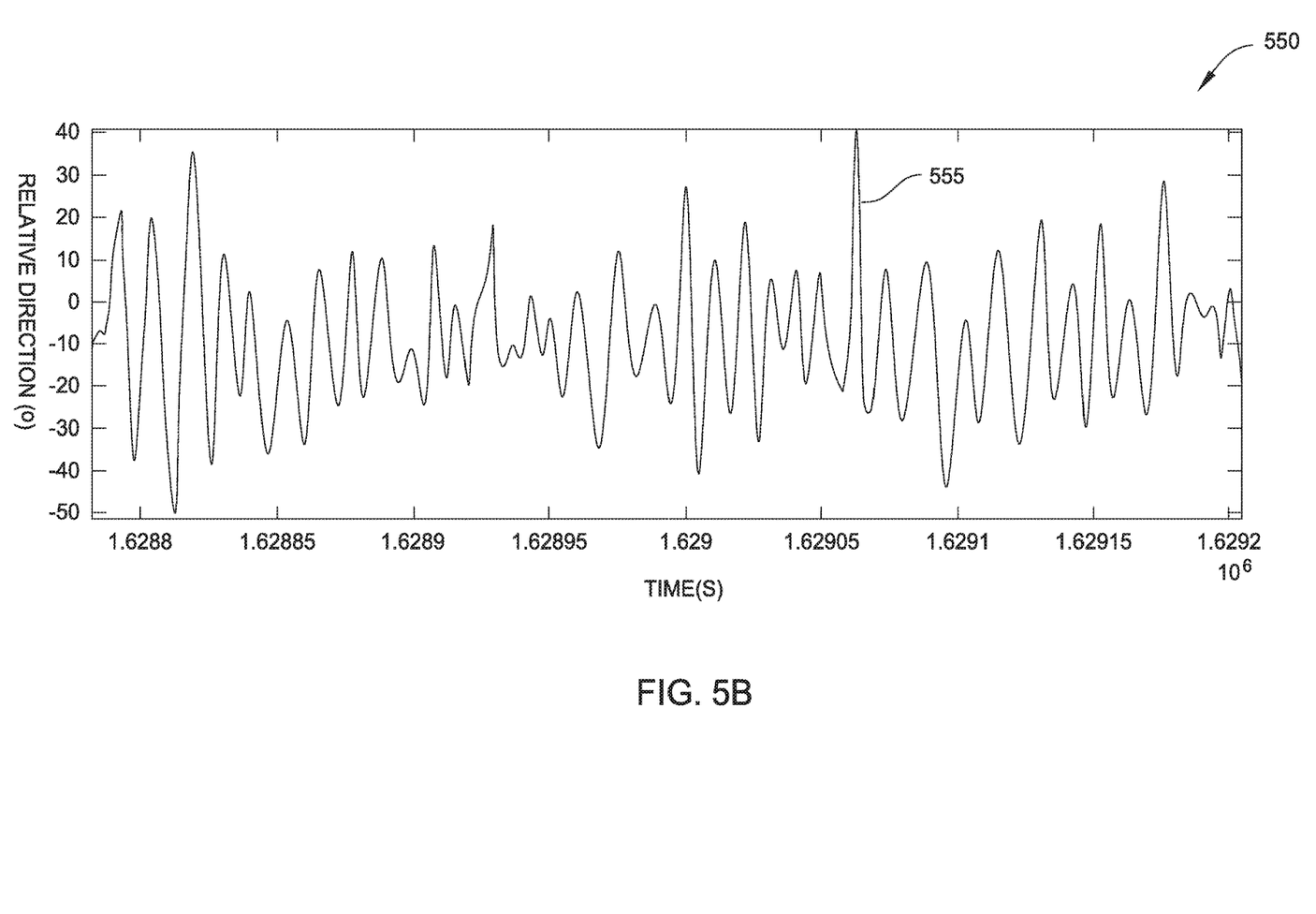

FIGS. 5A and 5B illustrate exemplary sensor signals without ice accumulation and with ice accumulation, respectively, according to one or more embodiments. In graph 500, a sensor signal 505 represents a wind direction signal from a mechanical wind vane without ice accumulation. In graph 550, a sensor signal 555 represents a wind direction signal from the mechanical wind vane with ice accumulation. In graphs 500, 550, the horizontal axis depicts time in seconds (s), or alternatively samples. The vertical axis depicts a direction of the rotor relative to the prevailing wind direction ("Relative Direction") in degrees (°). Due to the mechanical damping effect of accumulated ice, much of the high frequency content included in the sensor signal 505 is not present in the sensor signal 555.

Figure 6A:
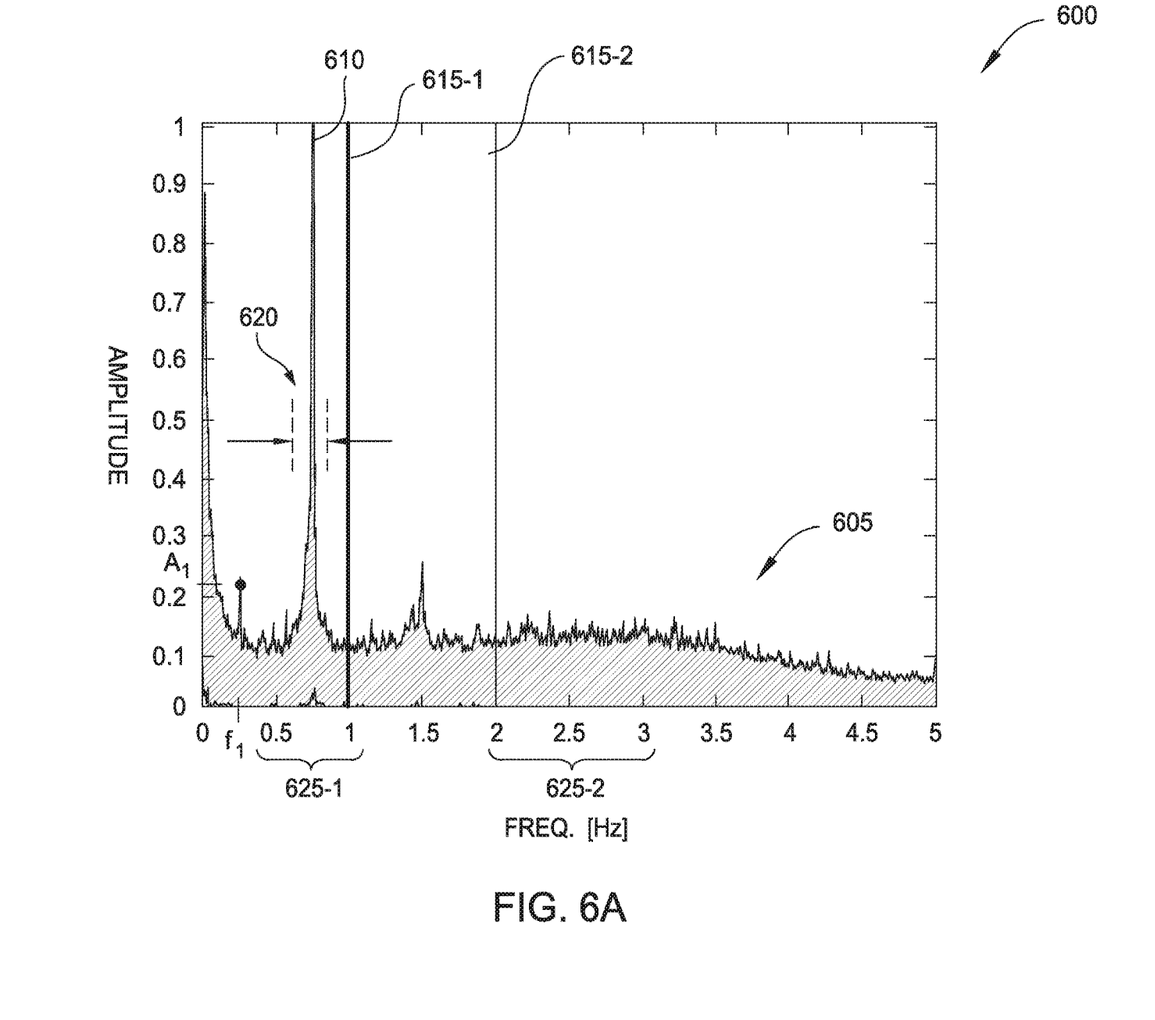
FIGS. 6A and 6B illustrate frequency information for exemplary sensor signals without ice accumulation and with ice accumulation, respectively, according to one or more embodiments.
Figure 6B:
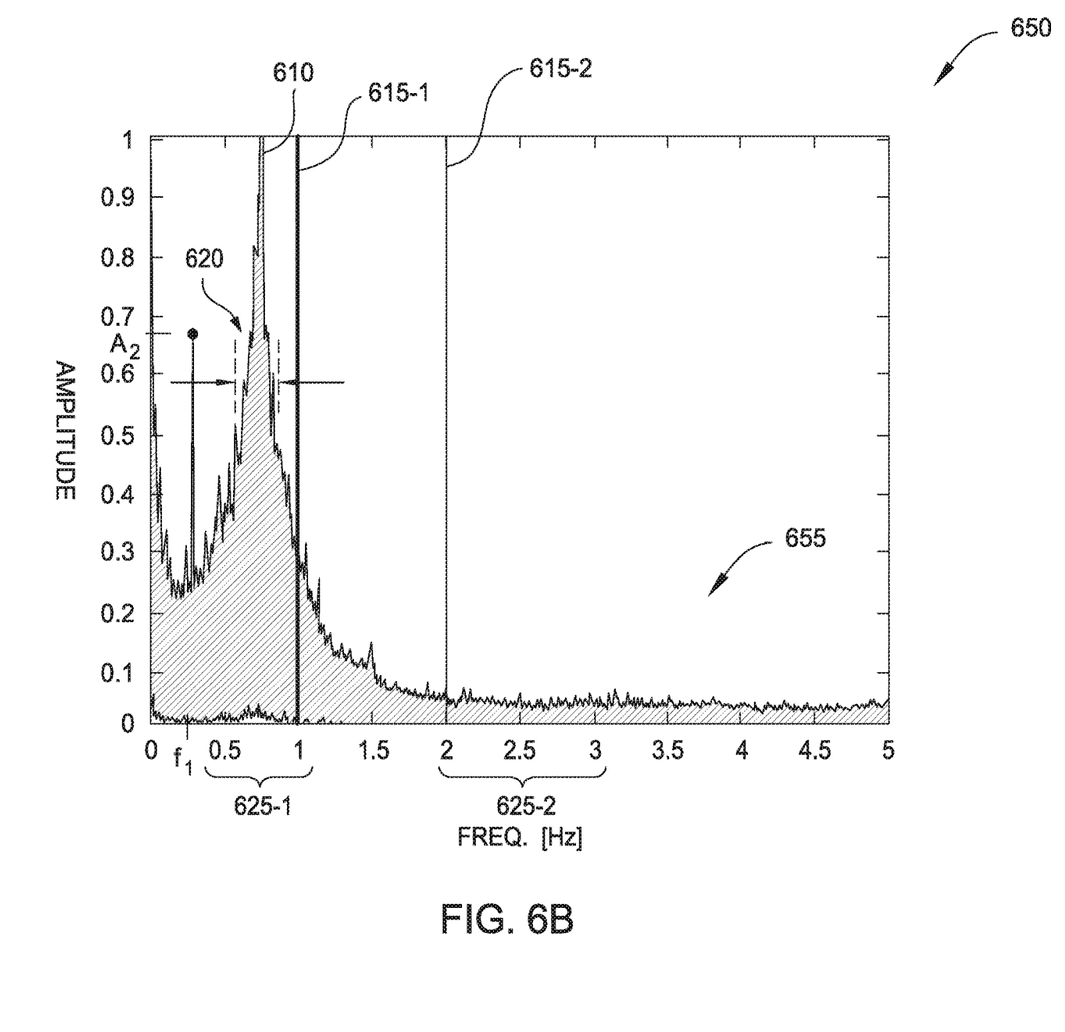

FIGS. 6A and 6B illustrate frequency information for exemplary sensor signals without ice accumulation and with ice accumulation, respectively, according to one or more embodiments. The frequency information may be acquired according to any suitable techniques, such as performing a FFT on the sensor signals.

In graph 600, a frequency spectrum 605 represents frequency information included in a wind direction signal from a mechanical wind vane without ice accumulation, such as the sensor signal 505 of FIG. 5A. In graph 650, a frequency spectrum 655 represents frequency information included in a wind direction signal from the mechanical wind vane with ice accumulation, such as the sensor signal 555 of FIG. 5B. In graphs 600, 650, the horizontal axis depicts frequency in hertz (Hz), and the vertical axis depicts an amplitude.

In graphs 600, 650, a frequency peak 610 occurs at about 0.7 Hz, which generally corresponds to the effects of each rotor blade passing the mechanical wind vane (or other mechanical sensor) during rotation of the rotor. In some embodiments, the effects comprise 3P effects. In some embodiments, higher harmonics of the effects are also present in the frequency spectra 605, 655. In some embodiments, the effects of each passing rotor blade are filtered from the frequency spectra 605, 655 before determining an icing condition of the wind turbine. In other embodiments, the effects of each passing rotor blade remain in the frequency spectra 605, 655 when determining an icing condition of the wind turbine.

The frequency spectrum 605, which represents frequency information corresponding to a mechanical wind vane without ice accumulation, is relatively evenly distributed across the illustrated frequency range, with many amplitude values around 0.1. On the other hand, the frequency spectrum 655 representing frequency information corresponding to a mechanical wind vane with ice accumulation, has a distribution skewed toward lower frequencies due to the effects of mechanical damping of the mechanical wind sensor. Any suitable techniques may be used to determining an icing condition of the wind turbine based on the frequency information included in the frequency spectra 605, 655.

In one embodiment, determining the icing condition of the wind turbine comprises determining whether a predefined percentage of power included in the sensor signal occurs below or above a predefined threshold frequency. For example, the predefined percentage of power may represent a predefined percentage of a power spectral density of the sensor signal. Graphs 600, 650 depict a first threshold frequency 615-1 at approximately 1 Hz, and a second threshold frequency 615-2 at approximately 2 Hz. In graph 600, about 20% of power in the frequency spectrum 605 occurs between 0 Hz and the first threshold frequency 615-1, and about 60% of the power occurs between the second threshold frequency 615-2 and 5 Hz. However, in graph 650, a much greater percentage (e.g., about 70%) of the power in the frequency spectrum 655 occurs between 0 Hz and the first threshold frequency 615-1, and a much lesser percentage of the power (e.g., about 15%) occurs between the second threshold frequency 615-2 and 5 Hz.

Assume that the controller has a predefined percentage value of 50% of the power occurring below the first threshold frequency 615-1 and/or a predefined percentage value of 25% of the power occurring above the second threshold frequency 615-2. Thus, the frequency spectrum 605 may indicate that the icing condition of the wind turbine corresponds to a no-ice condition, and the frequency spectrum 655 may indicate that ice has accumulated on the wind turbine.

In one embodiment, determining the icing condition of the wind turbine comprises determining whether the power included in the sensor signal exceeds a predefined amplitude at a predefined frequency. For example, at a first predefined frequency $f_1$, the frequency spectrum 605 has an amplitude A1 of approximately 0.22, and the frequency spectrum 655 has an amplitude A2 of approximately 0.68. Assuming that the controller has a predefined amplitude value of 0.5, the frequency spectrum 605 may indicate that the icing condition of the wind turbine corresponds to a no-ice condition, and the frequency spectrum 655 may indicate that ice has accumulated on the wind turbine.

In one embodiment, determining the icing condition of the wind turbine comprises determining whether the power included in the sensor signal exceeds a predefined amplitude within a predefined frequency interval. For example, within a predefined frequency interval 620 between about 0.6 Hz and 0.8 Hz, the power included in the frequency spectrum 605 is largely concentrated at the frequency peak 610, which may indicate that no ice has accumulated on the wind turbine. Within the predefined frequency interval 620, a significantly greater amount of power is included in the frequency spectrum 655 at frequencies surrounding the frequency peak 610, which may indicate that ice has accumulated on the wind turbine.

In one embodiment, determining the icing condition of the wind turbine comprises determining whether an average power included in the sensor signal exceeds a predefined amplitude within a predefined frequency interval. As discussed above, within the predefined frequency interval 620 between about 0.6 Hz and 0.8 Hz, a significantly greater amount of power is included in the frequency spectrum 655 than is included in the frequency spectrum 605. This corresponds to a larger average power for the frequency spectrum 655, which may indicate that ice has accumulated on the wind turbine.

In one embodiment, determining the icing condition of the wind turbine comprises determining a largest frequency value (or largest frequency interval) in which an amplitude of the power included in the sensor signal exceeds a predefined amplitude. In some cases, the largest frequency value (or largest frequency interval) may be compared with a threshold value. In some cases, the frequency peak 610 may be filtered from the frequency spectra 605, 655 prior to determining the largest frequency value or largest frequency interval. For example, a maximum frequency value where the amplitude exceeds 0.3 is less than about 0.1 Hz for frequency spectrum 605, and is about 0.5 Hz for frequency spectrum 655. The larger frequency value for frequency spectrum 655 may indicate that ice has accumulated on the wind turbine.

In one embodiment, determining the icing condition of the wind turbine comprises determining a ratio of a first average value of power included in a first frequency interval to a second average value of power included in a second frequency interval. Graphs 600, 650 include a first frequency interval 625-1 between about 0.5 Hz and 1 Hz, and a second frequency interval 625-2 between about 2 Hz and 3 Hz. For the frequency spectrum 605, the average value is about 0.1 for both the first frequency interval 625-1 and the second frequency interval 625-2, which results in a ratio of approximately 1 (0.1/0.1). However, for the frequency spectrum 655, the average value is about 0.45 for the first frequency interval 625-1, and about 0.05 for the second frequency interval 625-2, which results in a ratio of approximately 9 (0.45/0.05). Thus, for this example, a relatively larger ratio may indicate that ice has accumulated on the wind turbine. In some embodiments, the ratio may be compared with a threshold value to determine the icing condition of the wind turbine.

In one embodiment, determining the icing condition of the wind turbine comprises determining a shape of the power included in the sensor signal. For example, the controller may use feature detection to determine the shape of the power. The frequency spectrum 605 appears substantially rectangular across the illustrated frequency range due to its relatively even distribution, and the frequency spectrum 655 appears more triangular.

Although the individual techniques are described above as separate embodiments, other embodiments may include a combination of multiple techniques when determining the icing condition. For example, the controller may weight the results from different techniques to determine the icing condition. Further, other techniques suitable for distinguishing the frequency information included in the different frequency spectra 605, 655 are also contemplated.

Further, while the techniques are described above as determining simply whether or not ice has accumulated on the wind turbine, the techniques are also suitable for determining other icing condition information. For example, the techniques may be used to determine a likelihood that ice has formed on the wind turbine, an estimate of how much ice has formed on the wind turbine, whether an accumulation of ice on the wind turbine is increasing or decreasing, a rate of change of the accumulation of ice, and so forth.

In some embodiments, the controller is configured to determine whether an accumulation of ice on the wind turbine is increasing or decreasing based on a direction of shift within the frequency spectra for multiple sensor signals. The multiple sensor signals may include a reference signal corresponding to a predetermined icing condition (e.g., a no-ice condition), and/or a previously acquired sensor signal. Generally, as illustrated in frequency spectra 605, 655, a leftward shift (toward lower frequencies) indicates that the accumulation of ice on the wind turbine is increasing, and a rightward shift (toward higher frequencies) indicates that the accumulation of ice on the wind turbine is decreasing.

Further, while the frequency information discussed above used the specific example of a wind direction signal from a mechanical wind vane, other embodiments may acquire frequency information from other types of mechanical sensors, such as a mechanical anemometer.

Figure 7:
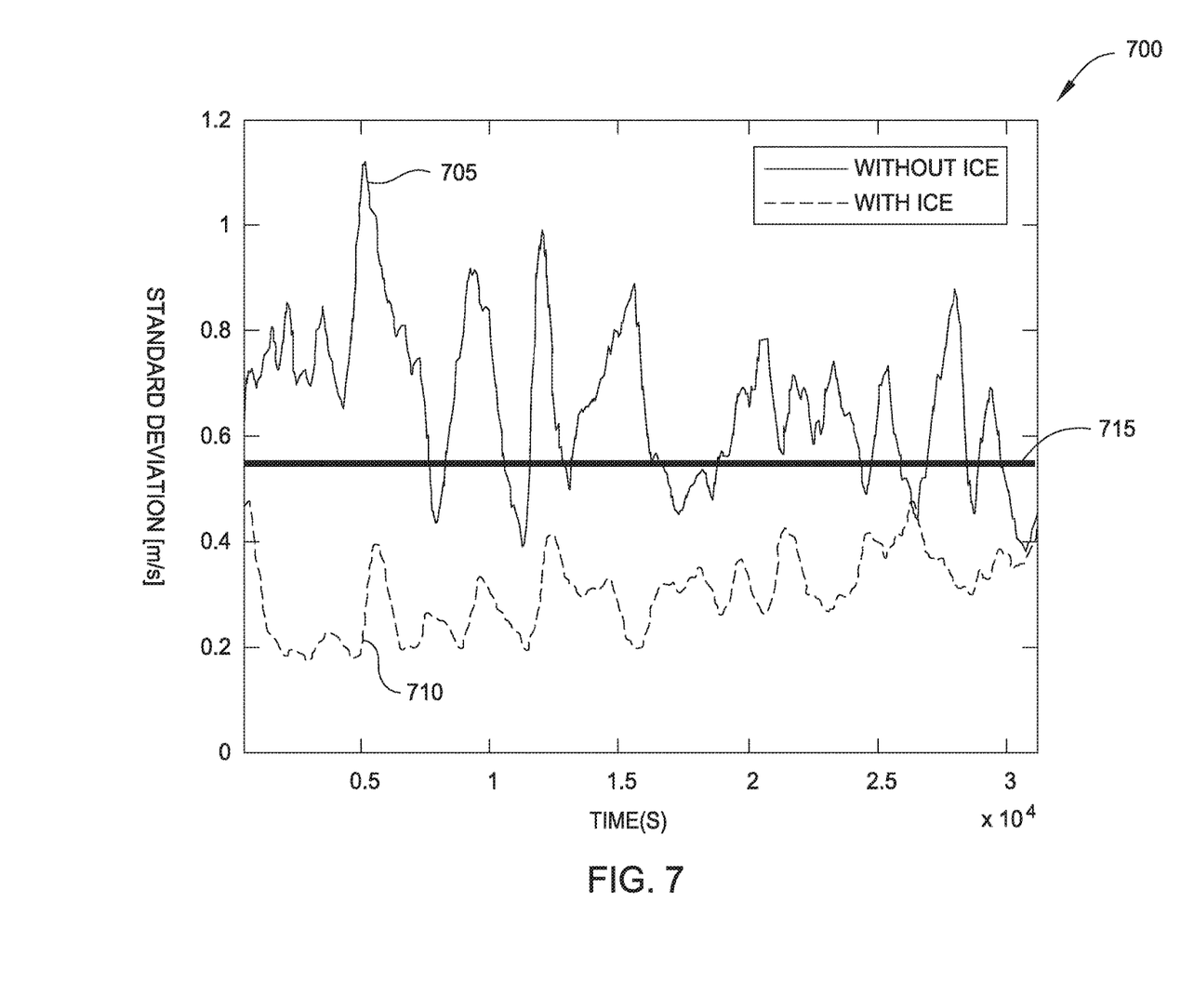
FIG. 7 illustrates determining a moving standard deviation for exemplary sensor signals without ice accumulation and with ice accumulation, according to one or more embodiments.

As discussed above, in some embodiments the controller is configured to determine one or more characteristics of the received sensor signals within the time domain. FIG. 7 illustrates determining a moving standard deviation for exemplary sensor signals without ice accumulation and with ice accumulation, according to one or more embodiments.

In graph 700, the horizontal axis depicts time in seconds (s), or alternatively samples. The vertical axis depicts a standard deviation of the wind speed in meters per second (m/s). A first signal 705 represents a moving standard deviation of a wind speed signal from a mechanical anemometer without ice accumulation, and a second signal 710 represents a moving standard deviation of a wind speed signal of the mechanical anemometer with ice accumulation. The graph 700 further depicts a threshold value 715.

In one embodiment, determining the icing condition of the wind turbine comprises determining whether an average value of the moving standard deviation is greater than or less than the threshold value 715. Generally, a greater standard deviation value corresponds to larger differences in amplitude of the sensor signal, which indicates less mechanical damping and therefore less (or no) ice accumulation. Conversely, a lesser standard deviation value indicates greater mechanical damping and therefore greater ice accumulation. The average of the first signal 705 is greater than the threshold value 715 and the average of the second signal 710 is less than the threshold value 715. Other techniques are also possible for determining the icing condition of the wind turbine. In one example, moving standard deviation values may be compared against reference values. In another example, one or more other statistical quantities may be calculated for the sensor signals.

In some embodiments, the controller is configured to determine whether an accumulation of ice on the wind turbine is increasing or decreasing based on a direction of shift within the moving standard deviation signals corresponding to multiple sensor signals. The multiple sensor signals may include a reference signal corresponding to a predetermined icing condition (e.g., a no-ice condition), and/or a previously acquired sensor signal. Generally, as illustrated in graph 700, a downward shift (toward lower standard deviation values) indicates that the accumulation of ice on the wind turbine is increasing, and an upward shift (toward greater standard deviation values) indicates that the accumulation of ice on the wind turbine is decreasing.

Further, while the one or more characteristics in the time domain that are discussed above used the specific example of a wind speed signal from a mechanical anemometer, other embodiments may determine the one or more characteristics in the time domain from other types of mechanical sensors, such as a mechanical wind vane.

Figure 8:
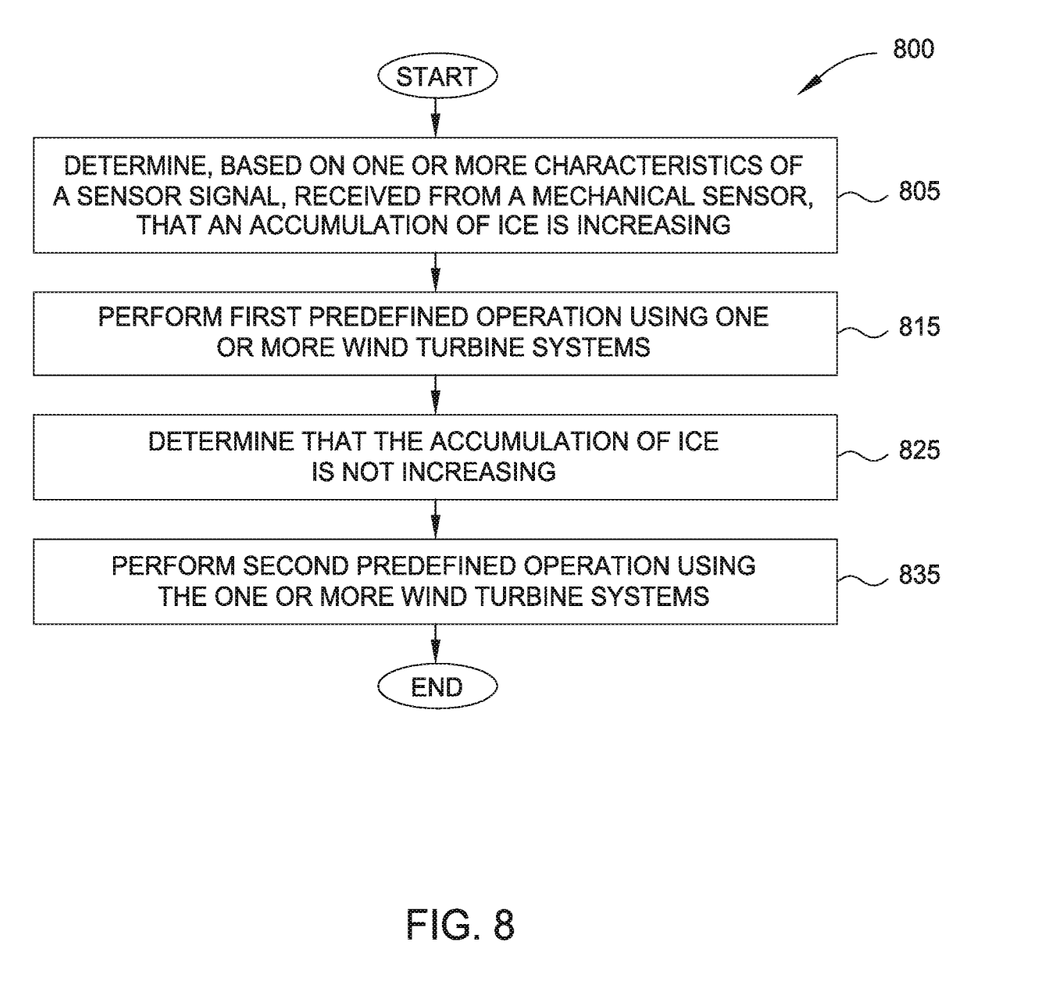
FIG. 8 illustrates an exemplary method for controlling operation of a wind turbine based on whether an accumulation of ice on the wind turbine is increasing, according to one or more embodiments.

FIG. 8 illustrates an exemplary method 800 for controlling operation of a wind turbine based on whether an accumulation of ice on the wind turbine is increasing, according to one or more embodiments. The method 800 may be used in conjunction with other embodiments, such as the controller 305 of FIG. 3 determining whether the accumulation of ice on the wind turbine is increasing or decreasing based on a direction of shift as described relative to FIGS. 6A, 6B, and 7.

Method 800 begins at block 805, where the controller 305 determines, based on one or more characteristics of a sensor signal received from a mechanical sensor, that an accumulation of ice is increasing. At block 815, the controller performs a first predefined operation using one or more wind turbine systems. In some embodiments, the controller is further configured to determine that the first predefined operation is more economically beneficial (e.g., corresponding to less lost power production) than one or more other predefined operations. In some embodiments, the first predefined operation comprises operating a power generation system of the wind turbine with a reduced efficiency. Other embodiments may include operating the power generation system differently, operating a deicing system, and/or operating a communication system of the one or more wind turbine systems.

At block 825, the controller determines that the accumulation of ice is not increasing. At block 835, the controller performs a second predefined operation using the one or more wind turbine systems. In some embodiments, the controller is further configured to determine that the second predefined operation is more economically beneficial (e.g., corresponding to less lost power production) than one or more other predefined operations. In some embodiments, the second predefined operation comprises operating the deicing system. Other embodiments may include operating the power generation system differently and/or operating a communication system of the one or more wind turbine systems. Method 800 ends following completion of block 835.

In the preceding, reference is made to embodiments presented in this disclosure. However, the scope of the present disclosure is not limited to specific described embodiments. Instead, any combination of the features and elements provided above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments, and advantages described herein are merely illustrative and are not considered elements or limitations of the appended claims except where explicitly recited in a claim(s).

As will be appreciated by one skilled in the art, the embodiments disclosed herein may be embodied as a system, method, or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

The present invention may be a system, a method, and/or a computer program product. The computer program product may include a computer-readable storage medium (or media) (e.g., a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing) having computer readable program instructions thereon for causing a processor to carry out aspects of the present invention.

Aspects of the present disclosure are described with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

The invention claimed is:

1. A controller for a wind turbine, the controller comprising:
   one or more computer processors; and
   a memory comprising computer-readable code that, when executed using the one or more computer processors, performs an operation comprising:
      determining one or more characteristics of a sensor signal received from a mechanical sensor of the wind turbine, wherein the one or more characteristics of the sensor signal indicate ice accumulation on the mechanical sensor;
      determining that ice is accumulating on the wind turbine based on the one or more characteristics of the sensor signal indicating ice accumulation on the mechanical sensor; and
      controlling an operation of one or more wind turbine systems in response to determining that ice is accumulating on the wind turbine.

2. The controller of claim 1, wherein the sensor signal comprises one of a wind speed signal and a wind direction signal.

3. The controller of claim 1, wherein determining one or more characteristics of the sensor signal comprises:
   determining frequency information included in the sensor signal.

4. The controller of claim 3, wherein determining one or more characteristics of the sensor signal further comprises one or more of:
   determining whether a predefined percentage of power included in the sensor signal occurs below or above a predefined threshold frequency;
   determining whether the power included in the sensor signal exceeds a predefined amplitude at a predefined frequency;
   determining whether the power included in the sensor signal exceeds a predefined amplitude within a predefined frequency interval;
   determining whether an average power included in the sensor signal exceeds a predefined amplitude within a predefined frequency interval;
   determining a largest frequency value or a largest frequency interval in which an amplitude of the power included in the sensor signal exceeds a predefined amplitude;
   determining a ratio of a first average value of power included in a first frequency interval to a second average value of power included in a second frequency interval; and
   determining a shape of the power included in the sensor signal.

5. The controller of claim 1, wherein determining one or more characteristics of the sensor signal comprises:
   determining a moving standard deviation of the sensor signal.

6. The controller of claim 1, further comprising determining whether an accumulation of ice on the wind turbine is increasing or decreasing.

7. The controller of claim 1, wherein determining one or more characteristics of the sensor signal is performed relative to a reference signal.

8. A method comprising:

determining one or more characteristics of a sensor signal received from a mechanical sensor of a wind turbine, wherein the one or more characteristics of the sensor signal indicate ice accumulation on the mechanical sensor;

determining that ice is accumulating on the wind turbine based on the one or more characteristics of the sensor signal indicating ice accumulation on the mechanical sensor; and controlling an operation of one or more wind turbine systems in response to determining that ice is accumulating on the wind turbine.

9. The method of claim 8, wherein the sensor signal comprises one of a wind speed signal and a wind direction signal.

10. The method of claim 8, wherein determining one or more characteristics of the sensor signal comprises:
determining frequency information included in the sensor signal.

11. The method of claim 10, wherein determining one or more characteristics of the sensor signal further comprises one or more of:
determining whether a predefined percentage of power included in the sensor signal occurs below or above a predefined threshold frequency;
determining whether the power included in the sensor signal exceeds a predefined amplitude at a predefined frequency;
determining whether the power included in the sensor signal exceeds a predefined amplitude within a predefined frequency interval;
determining whether an average power included in the sensor signal exceeds a predefined amplitude within a predefined frequency interval;
determining a largest frequency value or a largest frequency interval in which an amplitude of the power included in the sensor signal exceeds a predefined amplitude;
determining a ratio of a first average value of power included in a first frequency interval to a second average value of power included in a second frequency interval; and
determining a shape of the power included in the sensor signal.

12. The method of claim 8, wherein determining one or more characteristics of the sensor signal comprises:
determining a moving standard deviation of the sensor signal.

13. The method of claim 8, further comprising determining whether an accumulation of ice on the wind turbine is increasing or decreasing.

14. The method of claim 8, wherein determining one or more characteristics of the sensor signal is performed relative to a reference signal.

15. A wind turbine, comprising:
a tower;
a nacelle disposed on the tower;
a plurality of wind turbine components;
one or more wind turbine systems configured to control one or more of the plurality of wind turbine components;
one or more mechanical sensors; and
a control system communicatively coupled to the one or more mechanical sensors and the one or more wind turbine systems, the control system configured to perform an operation, comprising:
determining one or more characteristics of a sensor signal received from at least one of the one or more mechanical sensors, wherein the one or more characteristics of the sensor signal indicate ice accumulation on the one or more mechanical sensors;
determining that ice is accumulating on the wind turbine based on the one or more characteristics of the sensor signal indicating ice accumulation on the one or more mechanical sensors; and
controlling an operation at least one of the one or more wind turbine systems in response to determining that ice is accumulating on the wind turbine.

16. The wind turbine of claim 15, wherein the sensor signal comprises one of a wind speed signal and a wind direction signal.

17. The wind turbine of claim 15, wherein determining one or more characteristics of the sensor signal comprises determining a moving standard deviation of the sensor signal.

18. The wind turbine of claim 15, wherein determining one or more characteristics of the sensor signal comprises:
determining frequency information included in the sensor signal.

19. The wind turbine of claim 18, wherein determining one or more characteristics of the sensor signal further comprises one or more of:
determining whether a predefined percentage of power included in the sensor signal occurs below or above a predefined threshold frequency;
determining whether the power included in the sensor signal exceeds a predefined amplitude at a predefined frequency;
determining whether the power included in the sensor signal exceeds a predefined amplitude within a predefined frequency interval;
determining whether an average power included in the sensor signal exceeds a predefined amplitude within a predefined frequency interval;
determining a largest frequency value or a largest frequency interval in which an amplitude of the power included in the sensor signal exceeds a predefined amplitude;
determining a ratio of a first average value of power included in a first frequency interval to a second average value of power included in a second frequency interval; and
determining a shape of the power included in the sensor signal.

* * * * *